United States Patent
Sawada

(10) Patent No.: US 9,712,721 B2
(45) Date of Patent: Jul. 18, 2017

(54) IMAGE PROCESSING APPARATUS THAT PROCESSES IMAGE CONTAINING BACKGROUND COLOR

(71) Applicant: BROTHER KOGYO KABUSHIKI KAISHA, Nagoya, Aichi (JP)

(72) Inventor: Kazuhide Sawada, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 27 days.

(21) Appl. No.: 14/976,155

(22) Filed: Dec. 21, 2015

(65) Prior Publication Data

US 2016/0189389 A1 Jun. 30, 2016

(30) Foreign Application Priority Data

Dec. 26, 2014 (JP) ................................. 2014-265143

(51) Int. Cl.
H04N 1/60 (2006.01)

(52) U.S. Cl.
CPC ......... H04N 1/6027 (2013.01); H04N 1/6094 (2013.01)

(58) Field of Classification Search
CPC ...... H04N 1/6027; H04N 1/6094; H04N 1/56; H04N 1/02815; H04N 1/00806; G06T 2207/10024; G06T 2207/30176; G06T 7/00; G06T 2207/30196
See application file for complete search history.

(56) References Cited

U.S. PATENT DOCUMENTS

| 5,850,463 | A | * | 12/1998 | Horii | ...................... G06T 17/00 345/634 |
| 6,118,895 | A | * | 9/2000 | Hirota | ..................... H04N 1/56 358/522 |
| 7,099,041 | B1 | | 8/2006 | Moriya et al. | |
| 2001/0021042 | A1 | * | 9/2001 | Hirota | .................. H04N 1/3935 358/505 |
| 2004/0156544 | A1 | | 8/2004 | Kajihara | |
| 2006/0209323 | A1 | * | 9/2006 | Sawada | ................ H04N 1/6072 358/1.9 |

(Continued)

FOREIGN PATENT DOCUMENTS

| JP | 2000-253250 A | 9/2000 |
| JP | 2001-229374 A | 8/2001 |
| JP | 2004-192614 A | 7/2004 |

Primary Examiner — Jingge Wu
(74) Attorney, Agent, or Firm — Scully, Scott, Murphy & Presser, PC

(57) ABSTRACT

A first correction is executed on target image data representative of a target image when a ratio of a number of first type pixels relative to a number of a plurality of pixels in the target image data is determined to be greater than or equal to a prescribed value. A second correction is executed on the target image data when the ratio is determined to be smaller than the prescribed value. Pixel values of the first type pixels are within a first range that is defined based on a color value indicative of a background color of the target image. The first correction corrects both of internal pixel values and external pixel values which are within and out of a second range that contains the color value of the background color. The second correction corrects the internal pixel values and does not correct the external pixel values.

12 Claims, 12 Drawing Sheets

(56) References Cited

U.S. PATENT DOCUMENTS

| | | | | |
|---|---|---|---|---|
| 2007/0242294 | A1* | 10/2007 | Fujiwara | H04N 1/40062 358/1.9 |
| 2008/0226273 | A1* | 9/2008 | Kaku | H04N 5/2354 396/3 |
| 2008/0239347 | A1* | 10/2008 | Minamino | H04N 1/56 358/1.9 |
| 2012/0262486 | A1* | 10/2012 | Raghoebardajal | G06F 3/011 345/633 |
| 2013/0182002 | A1* | 7/2013 | Macciola | H04N 1/387 345/589 |
| 2014/0034719 | A1* | 2/2014 | Summers | G06Q 30/0241 235/375 |
| 2014/0185104 | A1* | 7/2014 | Hasegawa | H04N 1/38 358/452 |

* cited by examiner

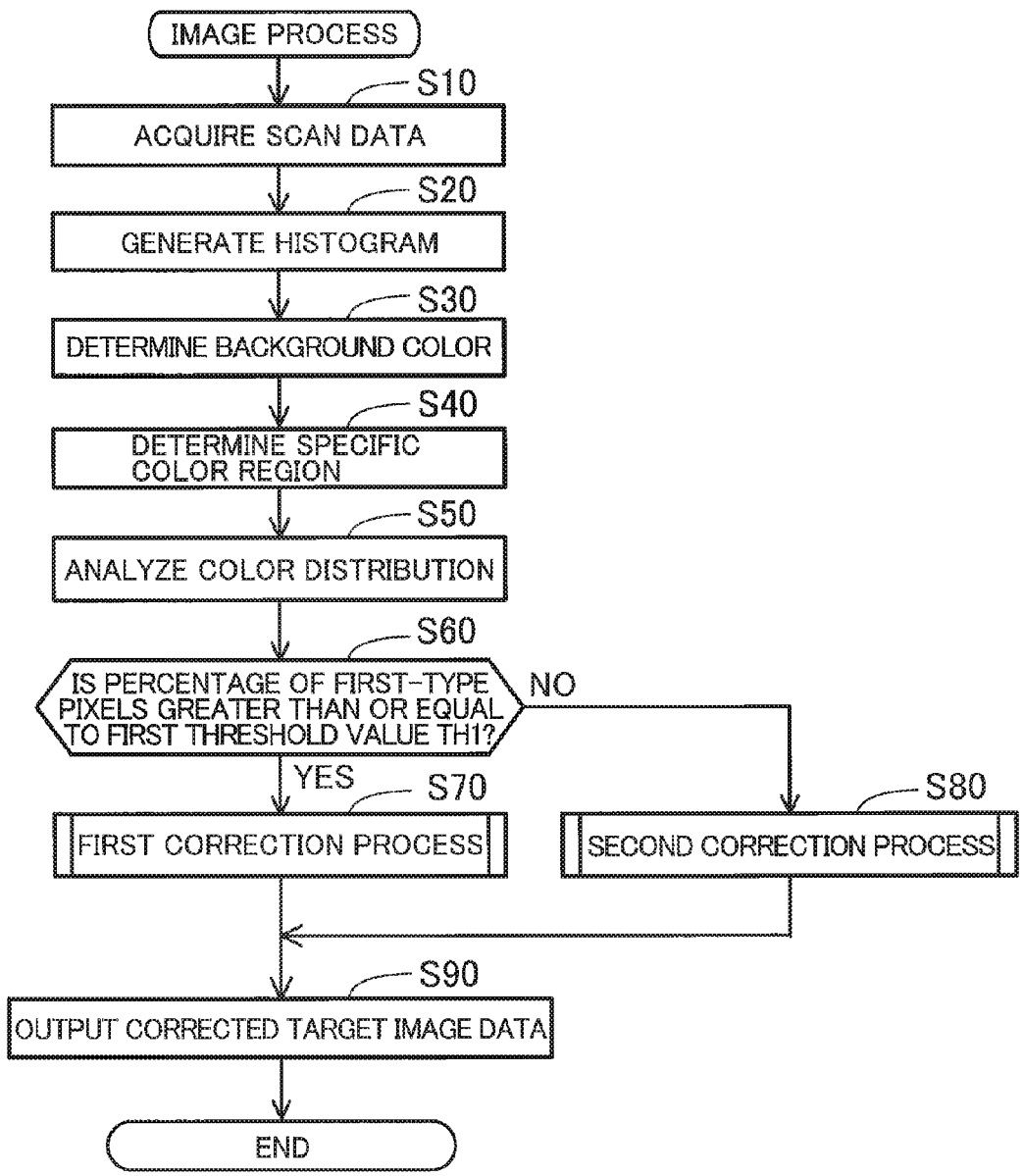

IMAGE PROCESSING APPARATUS THAT PROCESSES IMAGE CONTAINING BACKGROUND COLOR

CROSS REFERENCE TO RELATED APPLICATION

This application claims priority from Japanese Patent Application No. 2014-265143 filed Dec. 26, 2014. The entire content of the priority application is incorporated herein by reference.

TECHNICAL FIELD

The present disclosure relates to an image process for correcting an image by using image data, and more particularly to an image process for correcting an image in regards to background color within the image.

BACKGROUND

There is known a technology for correcting an image in regards to background color within the image. For example, the U.S. Pat. No. 7,099,041 discloses such technology, in which a correction curve for changing background color of an image to white is determined based on a histogram indicative of color distribution within the image. Values of all the pixels within the image are corrected by using the correction curve.

SUMMARY

It is an object of the disclosure to provide an improved image processing apparatus that can correct an image in regards to background color of the image and that can improve image quality of a post-correction image.

According to one aspect, the disclosure provides an image processing apparatus including a controller configured to perform: acquiring target image data representative of a target image, the target image data including a plurality of pixel values for a plurality of pixels in the target image data; determining whether or not a ratio of a number of first type pixels relative to a number of the plurality of pixels in the target image data is greater than or equal to a prescribed value; executing a first correction on the target image data when the ratio is determined to be greater than or equal to the prescribed value; executing a second correction on the target image data when the ratio is determined to be smaller than the prescribed value; and outputting corrected target image data that is obtained by executing the first correction or the second correction on the target image data. The first type pixels are the pixels in the target image data whose pixel values are within a first range. The first range is defined based on a color value indicative of a background color of the target image. The first correction corrects, among pixel values in the target image data, both of internal pixel values which are within a second range and external pixel values which are out of the second range. The second range contains the color value of the background color. The second correction corrects the internal pixel values and does not correct the external pixel values.

According to another aspect, the disclosure provides a method of processing an image, the method including: acquiring target image data representative of a target image, the target image data including a plurality of pixel values for a plurality of pixels in the target image data; determining whether or not a ratio of a number of first type pixels relative to a number of the plurality of pixels in the target image data is greater than or equal to a prescribed value; executing a first correction on the target image data when the ratio is determined to be greater than or equal to the prescribed value; executing a second correction on the target image data when the ratio is determined to be smaller than the prescribed value; and outputting corrected target image data that is obtained by executing the first correction or the second correction on the target image data. The first type pixels are the pixels in the target image data whose pixel values are within a first range. The first range is defined based on a color value indicative of a background color of the target image. The first correction corrects, among pixel values in the target image data, both of internal pixel values which are within a second range and external pixel values which are out of the second range. The second range contains the color value of the background color. The second correction corrects the internal pixel values and does not correct the external pixel values.

According to still another aspect, the disclosure provides a non-transitory computer-readable storage medium storing a set of program instructions for an image processing apparatus, the program instructions, when executed by the image processing apparatus, causing the image processing apparatus to perform: acquiring target image data representative of a target image, the target image data including a plurality of pixel values for a plurality of pixels in the target image data; determining whether or not a ratio of a number of first type pixels relative to a number of the plurality of pixels in the target image data is greater than or equal to a prescribed value; executing a first correction on the target image data when the ratio is determined to be greater than or equal to the prescribed value; executing a second correction on the target image data when the ratio is determined to be smaller than the prescribed value; and outputting corrected target image data that is obtained by executing the first correction or the second correction on the target image data. The first type pixels are the pixels in the target image data whose pixel values are within a first range. The first range is defined based on a color value indicative of a background color of the target image. The first correction corrects, among pixel values in the target image data, both of internal pixel values which are within a second range and external pixel values which are out of the second range. The second range contains the color value of the background color. The second correction corrects the internal pixel values and does not correct the external pixel values.

BRIEF DESCRIPTION OF THE DRAWINGS

The particular features and advantages of the disclosure will become apparent from the following description taken in connection with the accompanying drawings, in which:

FIG. 2 is a flowchart of an image process according to the embodiment;

DETAILED DESCRIPTION

Figure 1:
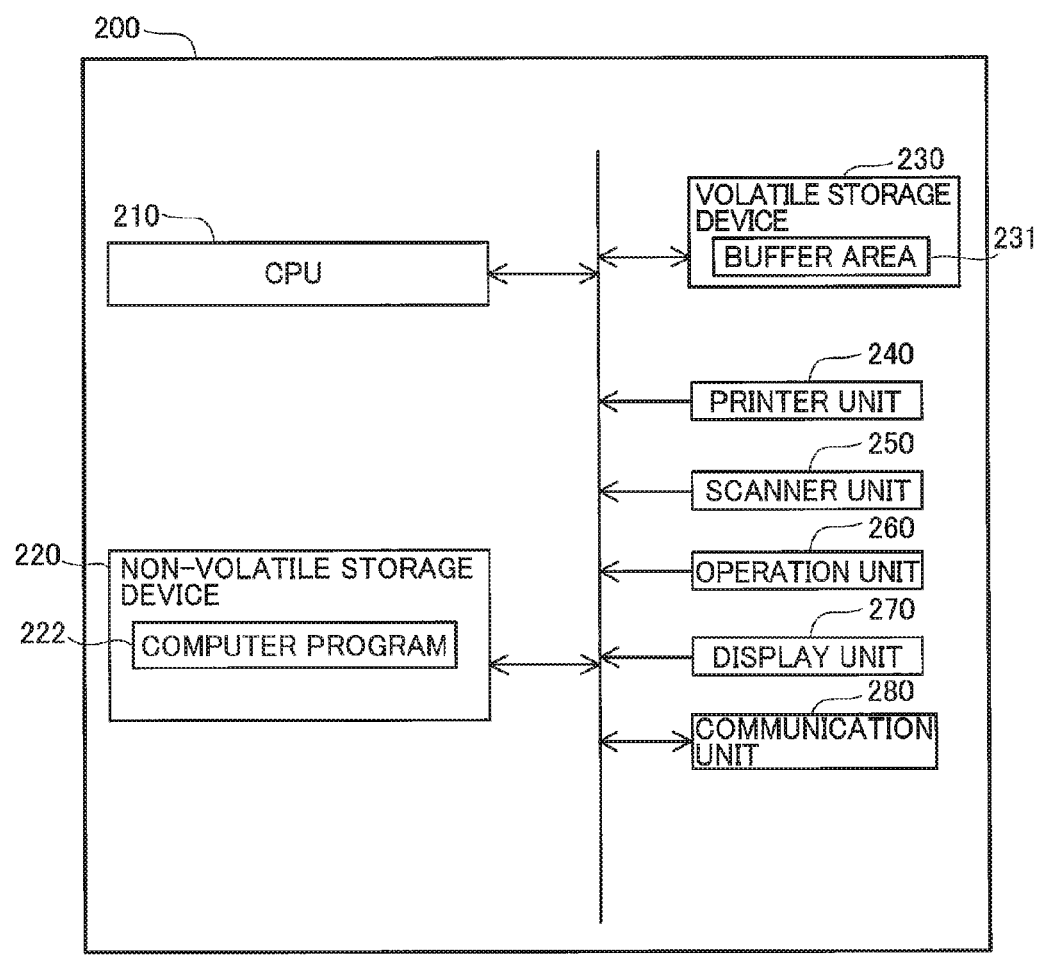
FIG. 1 is a block diagram showing a configuration of a multifunction apparatus according to an embodiment.

An image processing apparatus according to an embodiment will be described while referring to the accompanying drawings wherein like parts and components are designated by the same reference numerals to avoid duplicating description.

A. Embodiment

A-1: Configuration of Multifunction Apparatus 200

FIG. 1 is a block diagram showing the configuration of a multifunction apparatus 200 according to an embodiment.

The multifunction apparatus 200 includes: CPU 210; a non-volatile storage device 220 such as a hard disk drive or EEPROM; a volatile storage device 230 such as RAM; a printer unit 240; a scanner unit 250; an operation unit 260 such as a touch panel and buttons; a display unit 270 such as a liquid crystal panel covered with a touch panel; and a communication unit 280. The CPU 210 serves as a controller of the multifunction apparatus 200. The printer unit 240 is configured to print images in a predetermined system (e.g., inkjet or laser system). The scanner unit 250 is configured to generate scan data by optically reading a target (e.g., paper document). The communication unit 280 includes an interface to carry out data communication with an external device such as a personal computer 300 or a USB memory (not shown).

A computer program 222 is stored in the non-volatile storage device 220. For example, the computer program 222 is supplied in the form of being stored in CD-ROM or DVD-ROM. Or, the computer program 222 may be stored in advance in the non-volatile storage device 220 at the time of shipment of the multifunction apparatus 200. The computer program 222 may be downloaded from a server (not shown) that is connected to the multifunction apparatus 200 via a network. The volatile storage device 230 includes a buffer area 231 in which are temporarily stored various intermediate data that is generated when the CPU 210 carries out processes.

The CPU 210 executes the computer program 222 to realize a function of controlling the entire multifunction apparatus 200 and a function of performing an image process according to the embodiment, which will be described below.

A-2: Image Process

FIG. 2 is a flowchart of the image process according to the embodiment. The image process is executed, for example, when a user places a document on the scanner unit 250 and inputs a read command containing a ground-color removal command. The read command is to read the document and generate scan data. The ground-color removal command is to remove a ground color from a scan image represented by the scan data. Or, the image process may be executed when a user specifies scan data that has been already generated and stored in the non-volatile storage device 220 and then inputs a ground-color removal command. For example, the ground-color removal is executed in order to reduce an amount of color material used for printing or to reduce an amount of data when image data is compressed.

In S10, the CPU 210 (FIG. 1) acquires scan data as target image data to be processed. For example, the CPU 210 acquires target image data by reading a document with the use of the scanner unit 250 or by reading from the non-volatile storage device 220. The target image data represents a target image IM in which a plurality of pixels are arranged. In this example, the target image data is RGB image data in which color of each pixel is represented by an RGB value. The RGB value is defined by a combination of an R-component value, a G-component value, and a B-component value. The RGB value for each pixel is a color value indicative of color of the each pixel. The RGB value for each pixel will be referred to also as a pixel value, hereinafter. The color component values in the RGB value may be respectively referred to also as R value, G value, and B value. Incidentally, in this example, the component value of each color component in the RGB value is a 256-gradation value, ranging from 0 to 255.

Figure 3A:
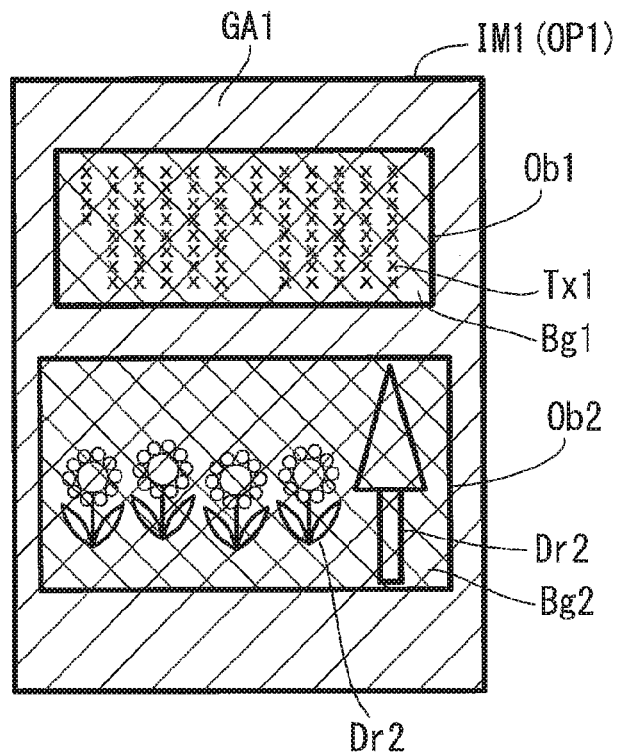
FIG. 3A is a diagram showing an example of a target image represented by target image data.
Figure 3B:
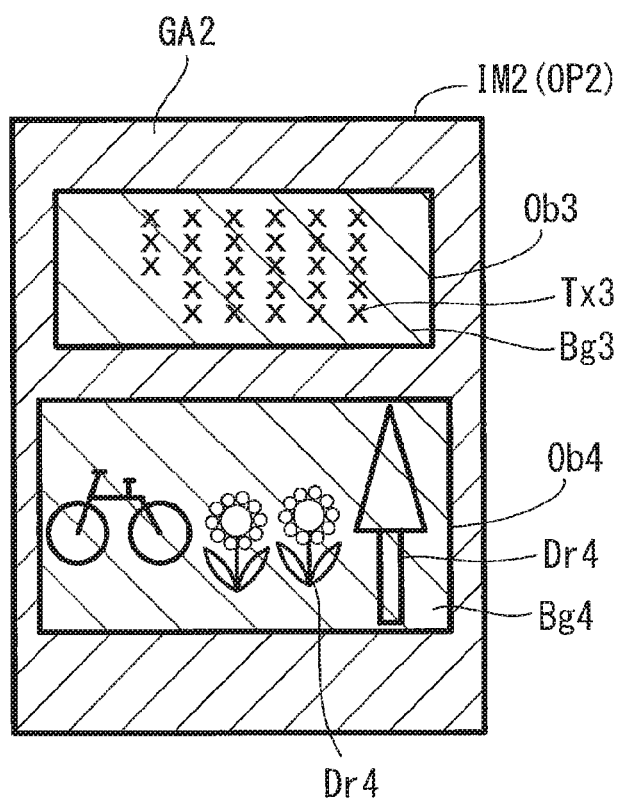
FIG. 3B is a diagram showing another example of the target image represented by target image data.

FIGS. 3A and 3B are diagrams showing examples IM1 and IM2 of the target image IM represented by the target image data. FIGS. 3A and 3B also show documents OP1 and OP2 that have been read by scanner to generate scan data (target image data) indicative of the target images IM1 and IM2.

The document OP1 shown in FIG. 3A is a paper sheet whose ground color is different from white (e.g., light red); and, on the paper sheet, an image that contains a rectangular object Ob1 and a rectangular object Ob2 is printed, with the rectangular object Ob1 containing characters Tx1 and the rectangular object Ob2 containing drawings Dr2. In the rectangular object Ob1, a portion from which the characters Tx1 are excluded is referred to as background Bg1 of the object Ob1. Similarly, in the rectangular object Ob2, a portion from which the drawings Dr2 are excluded is referred to as background Bg2 of the object Ob2. In the document OP1, a portion from which the objects Ob1 and Ob2 are excluded is referred to as background GA1 of the document OP1 or background GA1 of the target image IM1.

The background GA1 of the document OP1 (or target image IM1) has the same color as the ground color of the paper sheet.

On the document OP1, the objects Ob1 and Ob2 have different colors from what the objects Ob1 and Ob2 are originally supposed to have. In other words, the objects Ob1 and Ob2 have different colors from the colors that will be displayed if the objects Ob1 and Ob2 were printed on white paper. This is because a so-called color cast has occurred onto the objects Ob1 and Ob2 due to the effects of the ground color of the paper sheet. For example, suppose that the background Bg1 of the object Ob1 is originally blue. When being printed on the red paper sheet to form the document OP1, however, the background Bg1 of the object Ob1 becomes reddish blue due to the effects of the red ground of the paper sheet.

The target image IM1, which is represented by target image data that is obtained by scanning the document OP1, has the same characteristics as the above-described document OP1.

The document OP2 shown in FIG. 3B is a paper sheet whose ground color is white; and, on the paper sheet, an image that contains a rectangular object Ob3, a rectangular object Ob4, and a background GA2 is printed, with the object Ob3 containing characters Tx3, the object Ob4 containing drawings Dr4, and the background GA2 having a different color from white (e.g., light red). The image is printed across the entire paper sheet. Therefore, on the edge of OP2, there is no region left whose color is the same as the ground color (white) of the paper sheet. As in the case of the document OP1, in the rectangular object Ob3, a portion from which the characters Tx3 are excluded is referred to as background Bg3 of the object Ob3. In the rectangular object Ob4, a portion from which the drawings Dr4 are excluded is referred to as background Bg4 of the object Ob4. In the document OP2, a portion from which the objects Ob3 and Ob4 are excluded, that is, a portion where the background GA2 is printed, is referred to as background GA2 of the document OP2 or background GA2 of the target image IM2.

The ground color of the paper sheet of the document OP2 is white. Therefore, the objects Ob3 and Ob4 have the same colors as those that the objects Ob3 and Ob4 are originally supposed to have. That is, a so-called color cast has not occurred on the objects Ob3 and Ob4. For example, now assume that the backgrounds Bg3 and Bg4 of the objects Ob3 and Ob4 shown in FIG. 3B are originally supposed to have blue color. In this case, even on the document OP2, the backgrounds Bg3 and Bg4 of the objects Ob3 and Ob4 are blue. On the document OP2 shown in FIG. 3B, the backgrounds Bg3 and Bg4 of the objects Ob3 and Ob4 have a color that is brighter (higher in brightness) than the color of the background GA2 of the document OP2.

The target image IM2, which is represented by target image data that is obtained by scanning the document OP2, has the same characteristics as the above-described document OP2.

Figure 4A:
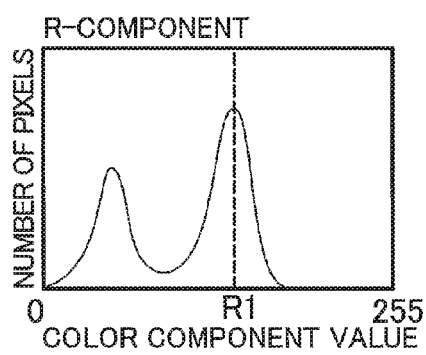
FIG. 4A is a diagram showing a histogram represented by histogram data for an R-component.
Figure 4B:
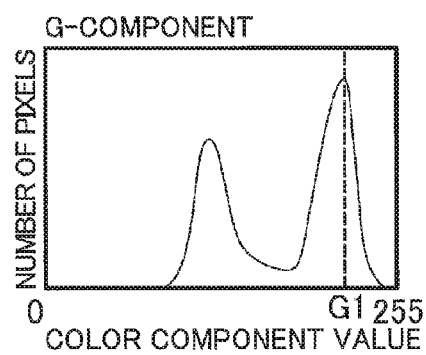
FIG. 4B is a diagram showing a histogram represented by histogram data for a G-component.
Figure 4C:
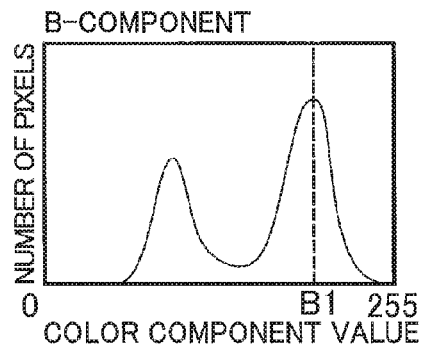
FIG. 4C is a diagram showing a histogram represented by histogram data for a B-component.

In S20, histogram data of the target image data is generated. FIGS. 4A, 4B, and 4C are diagrams showing histograms represented by the histogram data. The histogram data is generated for each of the three component values in RGB values. R-value histogram data shown in FIG. 4A is obtained by classifying the plurality of pixels in the target image IM represented by the target image data into a plurality of classes according to the R value of each pixel. In this example, the histogram data is generated regarding each of the 256 gradations for the R value as one class. The same is true for G-value histogram data shown in FIG. 4B and B-value histogram data shown in FIG. 4C.

In S30, the CPU 210 determines, based on the histogram data generated in S20, a background color value BC that is an RGB value indicating the color of the background of the target image IM. For example, if the target image IM is the target image IM1 shown in FIG. 3A, the background color value BC of the target image IM is a color value indicating the color of the background GA1 of the target image IM1. If the target image IM is the target image IM2 shown in FIG. 3B, the background color value BC of the target image IM is a color value indicating the color of the background GA2 of the target image IM2. In general, the background of a target image IM occupies a larger area relative to objects inside the target image IM. So, according to the present embodiment, the CPU 210 selects an RGB value indicating a color that is determined based on those values R1, G1, and B1 that most frequently appear in the histograms of the respective component values in FIGS. 4A to 4C, and sets the selected RGB value as the background color value BC. More specifically, the CPU 210 sets, as the background color value BC, the RGB value (R1, G1, B1) that is defined as having the most frequently appearing values R1, G1, and B1 as its respective component values.

Figure 5:
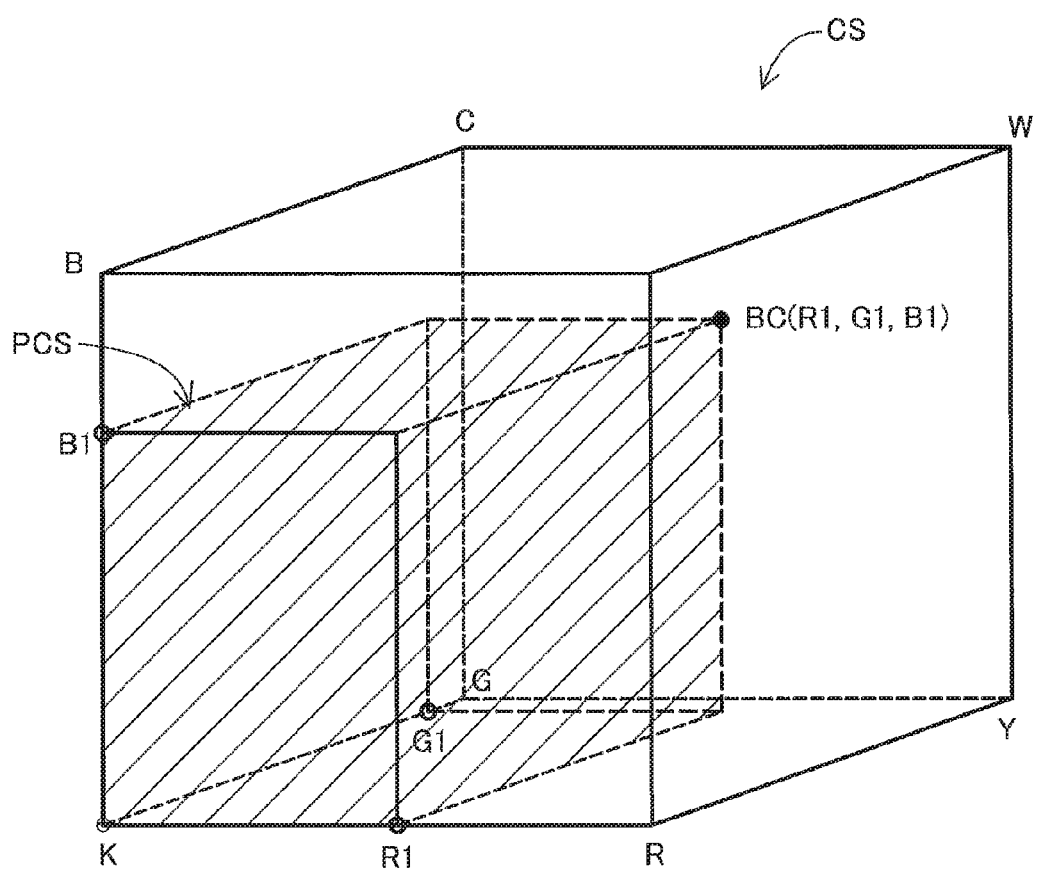
FIG. 5 is a diagram showing an example of a specific color region.

In S40, the CPU 210 determines, based on the background color value BC, a specific color region PCS (an example of a first range) inside an RGB color space CS that is defined by the R-, G-, and B-component values. The specific color region PCS will be used for determining the type of a correction process to be employed for the target image data. FIG. 5 is a diagram showing one example of the specific color region PCS defined in the RGB color space CS. In this example, the specific color region PCS is specified by the background color value BC such that an upper limit of the specific color region PCS in each color component is equal to the corresponding component value in the background color value BC (R1, G1, B1). That is, the specific color region PCS satisfies the following relationship that the R value in the specific color region PCS is greater than or equal to zero (0) and smaller than or equal to R1 ($0 \leq R \leq R1$), the G value in the specific color region PCS is greater than or equal to zero (0) and smaller than or equal to G1 ($0 \leq G \leq G1$), and the B value in the specific color region PCS is greater than or equal to zero (0) and smaller than or equal to B1 ($0 \leq B \leq B1$). In this case, the specific color region PCS is defined as a rectangular parallelepiped region as indicated by hatching in FIG. 5. In other words, now assume that the RGB color space CS is partitioned into two RGB-value ranges, that is, an RGB-value range containing black (0, 0, 0) and an RGB-value range containing white (255, 255, 255), with a boundary in each color component between the two RGB-value ranges having a value that is equal to the corresponding component value in the background color value BC (R1, G1, B1). The specific color region PCS is one of the RGB-value ranges that contains black (0, 0, 0). The specific color region PCS contains only those RGB values that indicate colors whose brightness is lower than the background color value BC (R1, G1, B1).

In S50, the CPU 210 analyzes color distribution of the target image data by using the specific color region PCS. More specifically, the plurality of pixels contained in the target image data are classified into: first-type pixels whose RGB values fall within the specific color region PCS; and second-type pixels whose RGB values are outside the specific color region PCS. The CPU 210 then calculates a ratio of the number of the first-type pixels to the number of all the pixels contained in the target image data. In other words, the CPU 210 calculates a percentage of the first-type pixels in all the pixels in the target image data.

Figure 6A:
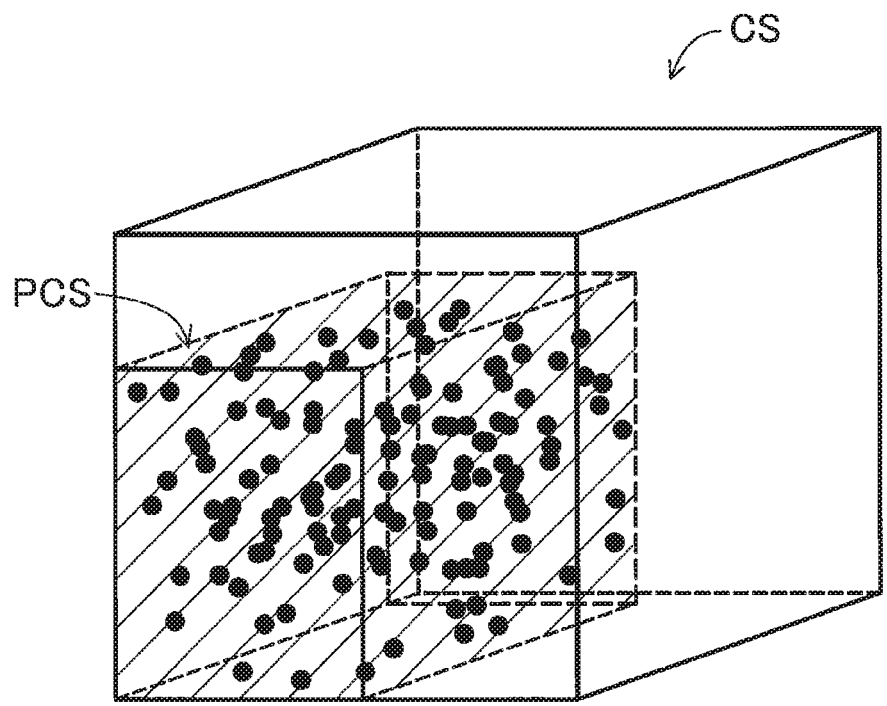
FIG. 6A is a diagram showing an example of color distribution of target image data.
Figure 6B:
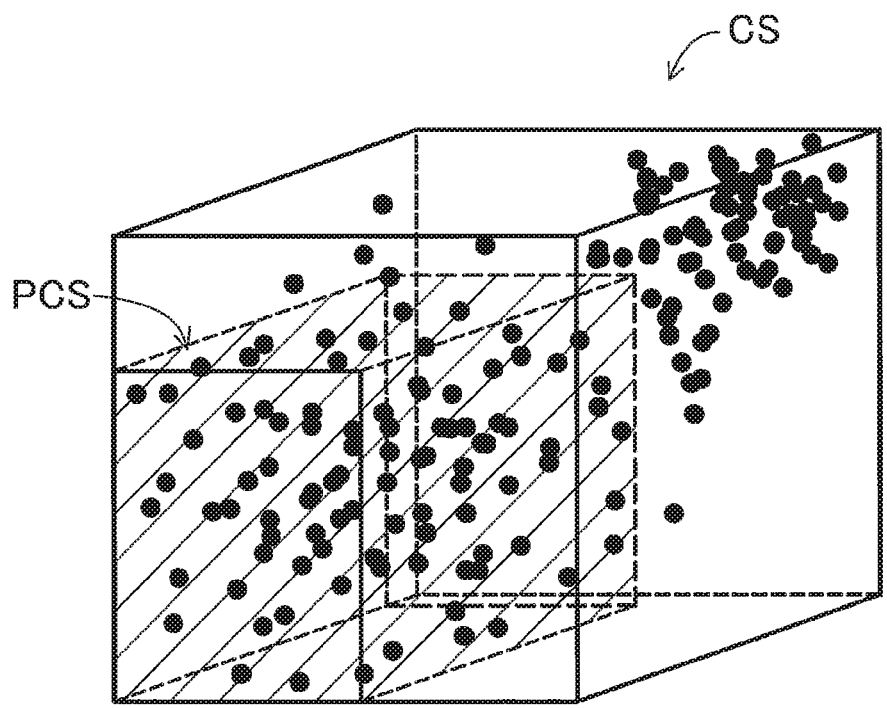
FIG. 6B is a diagram showing another example of color distribution of target image data.

FIGS. 6A and 6B are diagrams showing examples of the color distribution of the target image data. FIG. 6A shows color distribution of target image data representing the target image IM1 shown in FIG. 3A. FIG. 6B shows color distribution of target image data representing the target image IM2 shown in FIG. 3B.

The document OP1, on the basis of which the target image IM1 is generated, has a paper sheet whose color is equal to the color of the background GA1 of the document OP1 (color indicated by the background color value BC), and has the objects Ob1 and Ob2 printed on the paper sheet. Light of a component corresponding to the color of the paper sheet (i.e. the color indicated by the background color value BC) is absorbed by the entire part of the paper sheet. Therefore, in effect, on the document OP1, there is no object that is higher in brightness than the background color value BC. Due to variations in the reading performance of the scanner, a few pixels might be slightly higher in brightness than the background color value BC. However, in effect, the target image IM1, which is represented by scan data generated by reading the document OP1, contains almost no colors that are higher in brightness than the background color value BC. In the example of FIG. 6A, therefore, colors of almost all the pixels in the target image IM1 exist within the specific color region PCS.

Meanwhile, the document OP2, on the basis of which the target image IM2 is generated, has a white paper sheet, and has the background GA2 and the objects Ob3 and Ob4 printed on the white paper sheet. Therefore, the document OP2 is able to contain such objects whose colors are brighter than the color of the background GA2 (color indicated by the background color value BC). In the example of FIG. 3B, the objects Ob3 and Ob4 contain blue backgrounds Bg1 and Bg2. Accordingly, in effect, the target image IM2, which is represented by scan data generated by reading the document OP2, contains such color that is higher in brightness than the background color value BC. In the example of FIG. 6B, therefore, colors of a relatively large number of pixels exist outside of the specific color region PCS.

In S60, the CPU 210 determines whether or not the ratio of the number of the first-type pixels relative to the total number of the pixels within the target image data is greater than or equal to a prescribed first threshold value TH1. In other words, the CPU 210 determines whether or not the percentage of the first-type pixels in the target image data is greater than or equal to the first threshold value TH1. The first threshold value TH1 is one example of a prescribed value. For example, the first threshold value TH1 is defined taking into account variations in the background color in target image data. The first threshold value TH1 has such a value that can distinguish a target image that substantially contains a color region brighter than the background color and another target image that substantially contains no color region brighter than the background color. It is preferred that the first threshold value TH1 be greater than or equal to 95%. In this example, the first threshold value TH1 is set at 98%. As can be seen from the above description, when the target image IM represented by the target image data is the target image IM1 shown in FIG. 3A, it is determined that the percentage of the first-type pixels is greater than or equal to the first threshold value TH1. When the target image IM is the target image IM2 shown in FIG. 3B, it is determined that the percentage of the first-type pixels is less than the first threshold value TH1.

When the percentage of the first-type pixels in the target image data is greater than or equal to the first threshold value TH1 (S60: YES), the CPU 210 performs in S70 a first correction process on the target image data. The first correction process is such a correction process that is preferably carried out on such a target image that substantially contains no color region brighter than the background color. The first correction process will be described in detail later. On the other hand, when the percentage of the first-type pixels in the target image data is less than the first threshold value TH1 (S60: NO), the CPU 210 performs in S80 a second correction process on the target image data. The second correction process is such a correction process that is preferably carried out on such target image that substantially contains a color region brighter than the background color. The second correction process will be described in detail later.

In S90, the CPU 210 outputs corrected target image data (post-correction target image data), and ends the image process. For example, the corrected target image data is converted into a predetermined storage format (e.g., JPEG format or PDF format), and is outputted to the non-volatile storage device 220. As a result, the corrected target image data is stored in the non-volatile storage device 220, and a user becomes able to use the corrected target image data. Instead, the corrected target image data may be converted into print data and outputted to the printer unit 240. In this case, a corrected target image represented by the corrected target image data is printed by the printer unit 240.

A-3: First Correction Process

Figure 7:
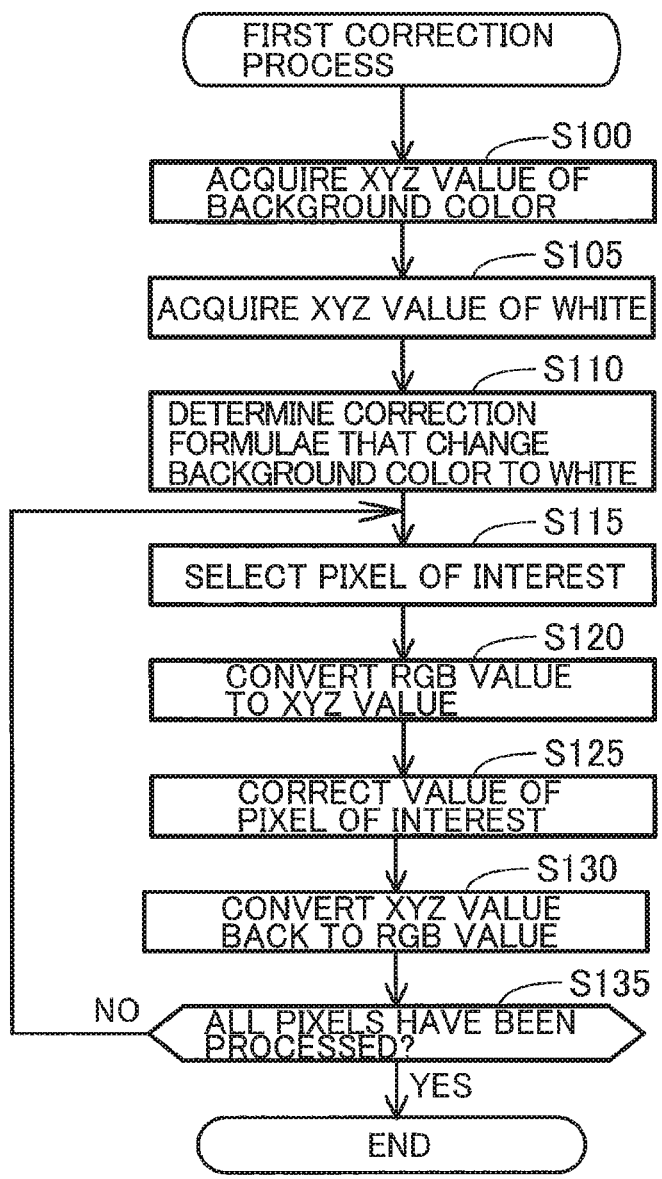
FIG. 7 is a flowchart of a first correction process shown in FIG. 2.

FIG. 7 is a flowchart of the first correction process. In S100, the CPU 210 converts the background color value BC (R1, G1, B1) into a color value defined in the CIEXYZ color space (also referred to as XYZ value), which is a color space not dependent on the device. The XYZ value is defined by a combination of an X-component value, a Y-component value, and a Z-component value. The color component values in the XYZ value are also referred to as X value, Y value, and Z value, respectively. The conversion is performed using conversion formulae between color values in the sRGB color space and color values in the CIEXYZ color space. The conversion formulae are defined in the standard "IEC 61966-2-1" that is set by International Electrotechnical Commission (IEC). Incidentally, in this example, the conversion is performed by using conversion formulae that are defined for when the CIE standard illuminant D65 (CIE D65) is used as a light source serving as a reference for white. Now suppose that the background color value BC is converted through the conversion from (R1, G1, B1) into (X1, Y1, Z1).

In S105, the CPU 210 acquires XYZ value (Xw, Yw, Zw) of white (white point). In this example, an XYZ value (0.3127, 0.3290, 0.3583) is set as the XYZ value (Xw, Yw, Zw) of white. The XYZ value (0.3127, 0.3290, 0.3583) is defined for when the CIE standard illuminant D65 (CIE D65) is used as a light source.

Figure 8A:
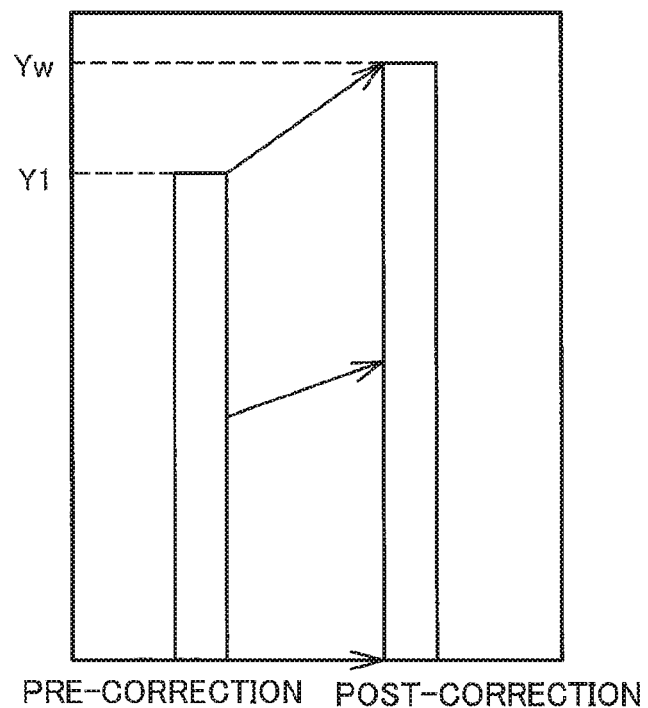
FIG. 8A is a diagram illustrating how a pixel value is corrected in the first correction process according to the embodiment.

In S110, the CPU 210 determines correction formulae for changing the background color inside the target image IM to white. FIG. 8A is a diagram explaining the first correction process in the present embodiment. In the first correction process, the color value of each pixel (each pixel value) in the target image data is normalized such that the background color value BC (X1, Y1, Z1) becomes white (Xw, Yw, Zw). For example, as for the Y value, as shown in FIG. 8A, the Y-value "Y1" of the background color value BC is changed to the Y-value "Yw" of white (Xw, Yw, Zw). Then, a Y value that is different from Y1 is changed such that pre-correction gradations are preserved. In other words, a Y value different from Y1 is changed such that a corrected Y value will continuously change with respect to change in the pre-correction Y value. The same is true for the X value and the Z value.

Now assume that a pre-correction XYZ value for some pixel is represented by a set of XYZ values (Xin, Yin, Zin), and a post-correction XYZ value for the subject pixel is represented by a set of XYZ values (Xout, Yout, Zout). In this example, the CPU 210 determines the correction formulae (1) to (3) for the X value, Y value, and Z value as shown below:

$$X\text{out}=(Xw/X1)\times X\text{in} \quad (1)$$

$$Y\text{out}=(Yw/Y1)\times Y\text{in} \quad (2)$$

$$Z\text{out}=(Zw/Z1)\times Z\text{in} \quad (3)$$

It is noted that the value (Xw/X1) increases as the X-component value Xw in the white value (Xw, Yw, Zw) representing white becomes larger compared with the X-component value X1 in the background color value (X1, Y1, Z1) representing the background color BC. Similarly, the value (Yw/Y1) increases as the Y-component value Yw in the white value (Xw, Yw, Zw) becomes larger compared with the Y-component value Y1 in the background color BC (X1, Y1, Z1). Similarly, the value (Zw/Z1) increases as the Z-component value Zw in the white value (Xw, Yw, Zw) becomes larger compared with the Z-component value Z1 in the background color (X1, Y1, Z1). In other words, each value (Xw/X1), (Yw/Y1), and (Zw/Z1) indicates an amount of difference between the value representing the background color and the value representing white. As can be seen from the above-described formulae (1) to (3), the first correction process changes the value (X1, Y1, Z1) of a pixel representing the background color to a value representing white (Xw, Yw, Zw). Moreover, the first correction process corrects, or changes, the value of a pixel (Xin, Yin, Zin) representing a color different from the background color (X1, Y1, Z1) based on: the amount of difference between the value of a pixel representing the background color (X1, Y1, Z1) and a value representing white (Xw, Yw, Zw); and the value of the subject pixel (Xin, Yin, Zin).

As can be seen from the above formulae (1) to (3) and FIG. 8A, the smaller a pre-correction component value (e.g., Yin) becomes, the smaller the correction amount (e.g., (Yout-Yin)) will be. In the CIEXYZ color space, as in the RGB color space, a smaller component value leads to a decrease in brightness. Accordingly, the lower the brightness of a pre-correction pixel becomes, the smaller the correction amount will be. Moreover, as can be seen from the above formulae (1) to (3), the correction amount continuously decreases as the brightness of a pixel is lowered.

In S115, the CPU 210 selects one pixel of interest within the target image IM. In S120, the CPU 210 uses the above-described conversion formulae to convert the RGB value of one pixel of interest into an XYZ value. The XYZ value of each pixel is also a color value indicative of color of the each pixel. The XYZ values for the pixels will therefore be referred to also as pixel values, hereinafter. In S125, the CPU 210 uses the above-described correction formulae (1) to (3) to correct the XYZ value of the pixel of interest. In S130, the CPU 210 inversely converts the corrected XYZ value of the pixel of interest into an RGB value. As a result, a corrected RGB value is obtained. Incidentally, when a corrected R value becomes larger than the upper limit (255 in this example) that the R value can reach, the CPU 210 sets the corrected R value to 255. The same is true for the G and B values.

In S135, the CPU 210 determines whether or not all pixels inside the target image IM have been processed as pixel of interest. When there remains at least one pixel that has not yet been processed (S135: NO), the CPU 210 returns to the process of S115 and then selects an unprocessed pixel as a pixel of interest to be processed next. After all the pixels inside the target image IM have been processed (S135: YES), the CPU 210 ends the first correction process. At this time, the corrected target image data is generated.

In the first correction process, the color of the entire area inside the target image IM is adjusted in such a direction that the background color (X1, Y1, Z1) approaches white (Xw, Yw, Zw). Therefore, the first correction process can change the background color inside the target image IM to white. Furthermore, if a color cast is occurred in a target image IM due to the ground color of a paper sheet of a document OP, from which the target image IM is generated, the first correction process can eliminate the color cast such that the color of an object inside the target image IM will become closer to what the object is originally supposed to have. On the other hand, if the target image IM contains such a bright region whose color is higher in brightness than the background color, the first correction process might possibly change the color within the bright region to such a color that is close to or completely identical with white.

A-4: Second Correction Process

Figure 9:
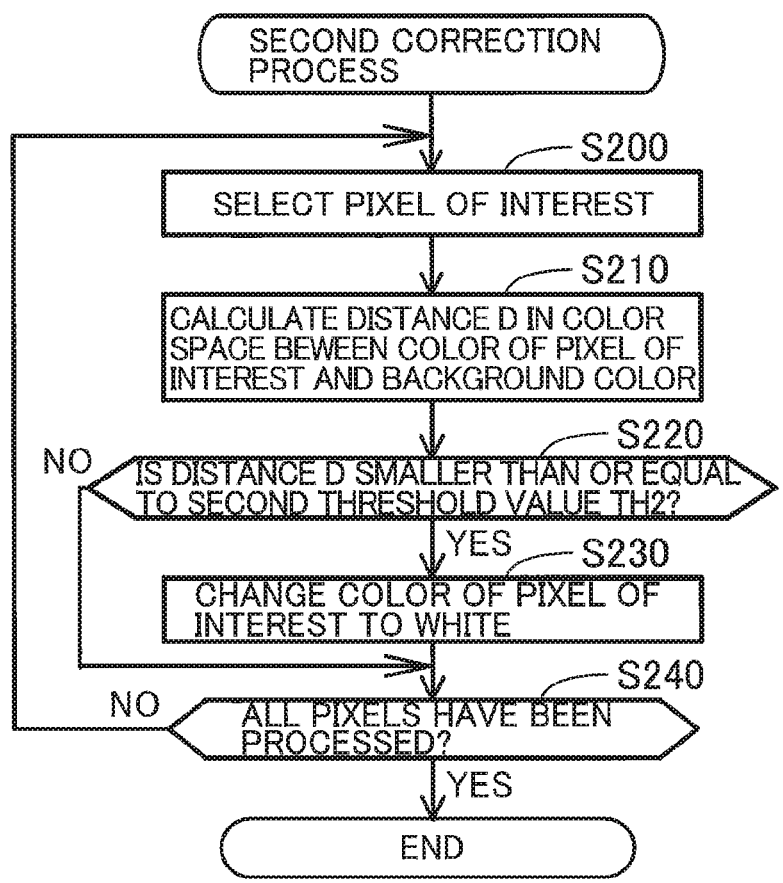
FIG. 9 is a flowchart of a second correction process shown in FIG. 2.

FIG. 9 is a flowchart of the second correction process. In S200, the CPU 210 selects one pixel of interest inside the target image IM. In S210, the CPU 210 calculates a distance D in the RGB color space between the color of the pixel of interest and the background color. More specifically, the CPU 210 calculates the Euclidean distance defined in the RGB color space between the RGB value of the pixel of interest and the background color value BC (R1, G1, B1).

In S220, the CPU 210 determines whether or not the calculated distance D is less than or equal to a prescribed second threshold value TH2. For example, the second threshold value TH2 is defined based on reading characteristics of the scanner, that is, an amount of variations in a pixel value that the scanner can generate when reading the same color on a document. The second threshold value TH2 defines a background-color approximate region (not shown in the drawings). The background-color approximate region is centered around the background color value BC. The background-color approximate region is such a region that a distance from the background color value BC to any color value falling in the background approximate region is smaller than or equal to the second threshold value TH2. Thus, any color falling in the background-color approximate region can be regarded as being substantially identical to the background color BC. For example, the second threshold value TH2 is about 5% to 30% of the entire range (256 in this example) in which each component value of the color space is defined. In this example, the second threshold value TH2 is set at 50 in the RGB color space in which 256 gradations of 0 to 255 are defined for each component value. The background-color approximate region is an example of a second range.

When the calculated distance D is less than or equal to the second threshold value TH2 (S220: YES), in S230 the CPU 210 changes the color of the pixel of interest to white. That is, the CPU 210 sets the RGB value of the pixel of interest to (255, 255, 255). On the other hand, when the calculated distance D is greater than the second threshold value TH2

(S220: NO), the CPU 210 skips S230. Accordingly, the color of the pixel of interest remains unchanged at its original value.

In S240, the CPU 210 determines whether or not all pixels inside the target image IM have been processed as pixel of interest. When there remains at least one pixel that has not yet been processed (S240: NO), the CPU 210 returns to the process of S200 and then selects an unprocessed pixel as a pixel of interest to be processed next. After all the pixels inside the target image IM have been processed (S240: YES), the CPU 210 ends the second correction process. At this time, the corrected target image data is generated.

The second correction process changes, to white, color of both of: a region whose color is identical to the background color; and a region whose color can be regarded as being substantially identical to the background color. Meanwhile, the second correction process does not change the color of a region whose color is substantially different from the background color. In that manner, the second correction process can change, to white, those colors in the target image IM that are substantially identical with the background color. Furthermore, the second correction process can maintain the color of an object that is substantially different from the background of the target image IM so that the object continues to have its pre-correction color.

In the above-described embodiment, the CPU 210 determines whether or not the ratio of the number of the first-type pixels relative to the total number of the pixels in the target image data is greater than or equal to the first threshold value TH1 (S60 in FIG. 2). The first-type pixels are defined as part of the pixels within the target image data that have their color values falling in the specific color region PCS. In other words, the first-type pixels are defined as the pixels in the target image data whose color values are within the specific color region PCS. The specific color region PCS is defined based on the background color of the target image IM as shown in FIG. 5. When the ratio of the number of the first-type pixels relative to the number of the pixels in the target image data is greater than or equal to the prescribed value TH1 (S60: YES), the CPU 210 performs the first correction process on the target image data (S70). On the other hand, when the ratio of the number of the first-type pixels relative to the number of the pixels in the target image data is smaller than the prescribed value TH1 (S60: NO), the CPU 210 performs the second correction process on the target image data (S80).

In other words, the CPU 210 determines whether or not the first-type pixels occupy at least the prescribed percentage TH1 in the target image data (S60 in FIG. 2). When the first-type pixels occupy at least the prescribed percentage TH1 in the target image data (S60: YES), the CPU 210 performs the first correction process on the target image data (S70). On the other hand, when the first-type pixels occupy only a portion that is smaller than the prescribed percentage TH1 in the target image data (S60: NO), the CPU 210 performs the second correction process on the target image data (S80).

In the second correction process, among the plurality of pixels inside the target image IM, those pixels whose color values are within the background-color approximate region are corrected in their color values, while the other pixels whose color values are outside of the background-color approximate region are not corrected in their color values. In other words, only those pixel values in the target image data that fall within the background-color approximate region are corrected in the second correction process. The background-color approximate region contains the background color value BC representing the background color. The distance D from the background color value BC to any color falling within the background-color approximate region is less than or equal to the second threshold value TH2. In the first correction process, as described above, all the pixels inside the target image IM are corrected in their color values. That is, in the first correction process, of the plurality of pixels inside the target image data, both of the pixels whose color values are within the background-color approximate region and the pixels whose color values are outside of the background-color approximate region are corrected in their color values. In other words, all the pixel values in the target image data are corrected in the first correction process.

According to the above-described configuration, one of the first correction process and the second correction process is selected dependently on whether or not the ratio of the number of the first-type pixels relative to the total number of the pixels in the target image data is greater than or equal to the prescribed value TH1. The selected first or second correction process is performed on the target image data as a correction process concerning the background color of the target image IM. Accordingly, an appropriate correction process can be performed depending on the characteristics of the target image IM. Therefore, the image quality of the corrected target image IM can be improved.

Below is a more concrete description.

Figure 10A:
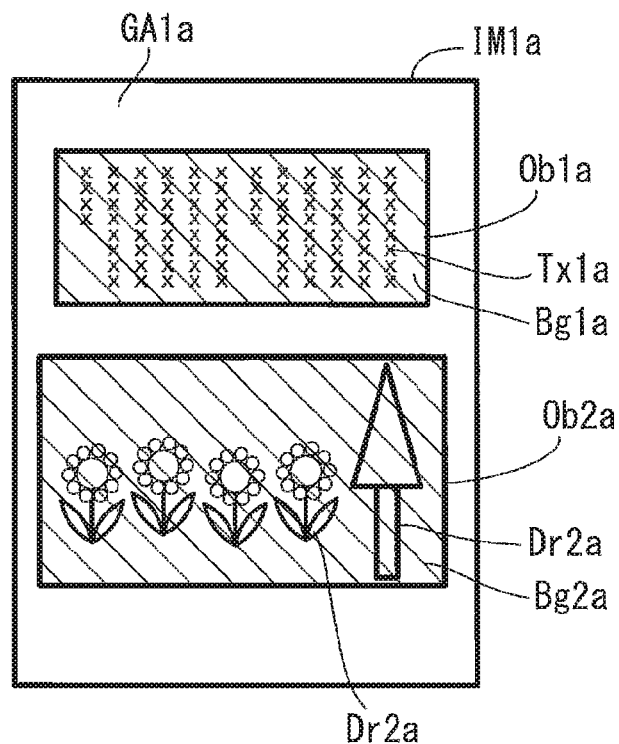
FIG. 10A is a diagram showing an example of a post-correction target image that is obtained by subjecting the target image shown in FIG. 3A to the first correction process in the embodiment.

FIG. 10A shows an example of a corrected target image IM1a that is obtained after the first correction process is performed on target image data representing the target image IM1 shown in FIG. 3A. As described already, color cast is occurred in the target image IM1 due to the effects of the color of the paper sheet of the document OP1, which is the basis of the target image IM1. The percentage of the first-type pixels in the target image IM1 is greater than or equal to the prescribed value TH1. Accordingly, during the image processing in the embodiment, the first correction process is carried out on the target image data representing the target image IM1. It can therefore be said that the corrected target image IM1a shown in FIG. 10A is one example of an image represented by the corrected target image data that is obtained through the image process according to the present embodiment.

More specifically, through the first correction process, color of the background GA1 in the target image IM1 (FIG. 3A) is changed to white. So, the corrected target image IM1a (FIG. 10A) has a white background GA1a. Therefore, removal of the background color is appropriately carried out. Also through the first correction process, the color cast in the pre-correction objects Ob1 and Ob2 (FIG. 3A) is eliminated, and no color cast is occurred in post-correction objects Ob1a and Ob2a in the corrected target image IM1a (FIG. 10A). As a result, in the objects Ob1a, Ob2a, all of the backgrounds Bg1a, Bg2a, characters Tx1a, and drawings Dr2a have the same colors as those that the portions Bg1a, Bg2a, Tx1a, and Dr2a are originally supposed to have. In this manner, the target image IM1 shown in FIG. 3A is appropriately corrected according to the embodiment.

Figure 10B:
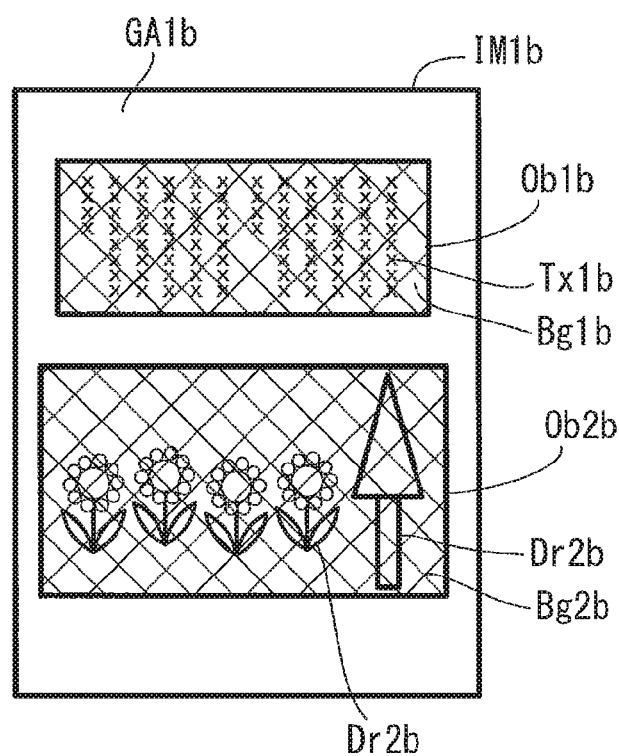
FIG. 10B is a diagram showing a comparative example of a post-correction target image that will be obtained if the target image shown in FIG. 3A were subjected to the second correction process in the embodiment.

As a comparative example, FIG. 10B shows a corrected target image IM1b that will be obtained if the second correction process were performed on the target image data representing the target image IM1 of FIG. 3A. Through the second correction process, the color of the background GA1 in the target image IM1 (FIG. 3A) is changed to white. Therefore, the corrected target image IM1b (FIG. 10B) also has a white background GA1b. Therefore, removal of the background color is appropriately carried out. However, the colors of the objects Ob1 and Ob2 in the target image IM1

(FIG. 3A) are not changed, and therefore the color cast in the objects Ob1 and Ob2 are not eliminated. Accordingly, the color cast remains in post-correction objects Ob1b and Ob2b in the corrected target image IM1b (FIG. 10B). The corrected target image IM1b looks unnatural because color of the background has been removed, but color cast has remained in the objects.

Figure 11A:
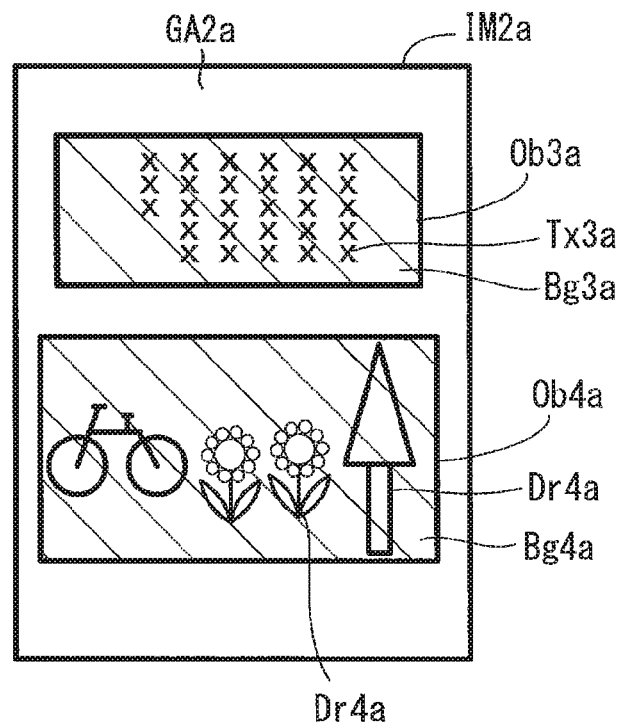
FIG. 11A is a diagram showing an example of a post-correction target image that is obtained by subjecting the target image shown in FIG. 3B to the second correction process in the embodiment.

FIG. 11A shows a corrected target image IM2a that is obtained after the second correction process is performed on the target image data representing the target image IM2 of FIG. 3B. As described already, color of the paper sheet of the document OP2, which is the basis of the target image IM2, is white. So, the background GA2 and the objects Ob3 and Ob4 in the target image IM2 have the same colors as those that the portions GA2 and the objects Ob3 and Ob4 are originally supposed to have. The possibility is therefore relatively high that the objects Ob3 and Ob4 contain colors brighter than the color of the background GA2. The percentage of the first-type pixels in the target image IM2 is smaller than the prescribed value TH1. Therefore, in the image processing of the embodiment, the second correction process is performed on the target image data representing the target image IM2. It can therefore be said that the corrected target image IM2a shown in FIG. 11A is one example of an image represented by the corrected target image data that is obtained through the image process according to the present embodiment.

Through the second correction process, the color of the background GA2 in the target image IM2 (FIG. 3B) is changed to white. Accordingly, the corrected target image IM2a has a white background GA2a. Therefore, removal of the background color is appropriately carried out. Also through the second correction process, colors of the objects Ob3 and Ob4 in the target image IM2 are not changed. Accordingly, colors of post-correction objects Ob3a and Ob4a in the corrected target image IM2a (FIG. 11A) have the same colors as those of the pre-correction objects Ob3 and Ob4 in the pre-correction target image IM2. That is, the objects Ob3a and Ob4a still have the colors the same as those that the objects Ob3 and Ob4 are originally supposed to have. In that manner, the target image IM2 in FIG. 3B is appropriately corrected through the image process of the present embodiment.

Figure 11B:
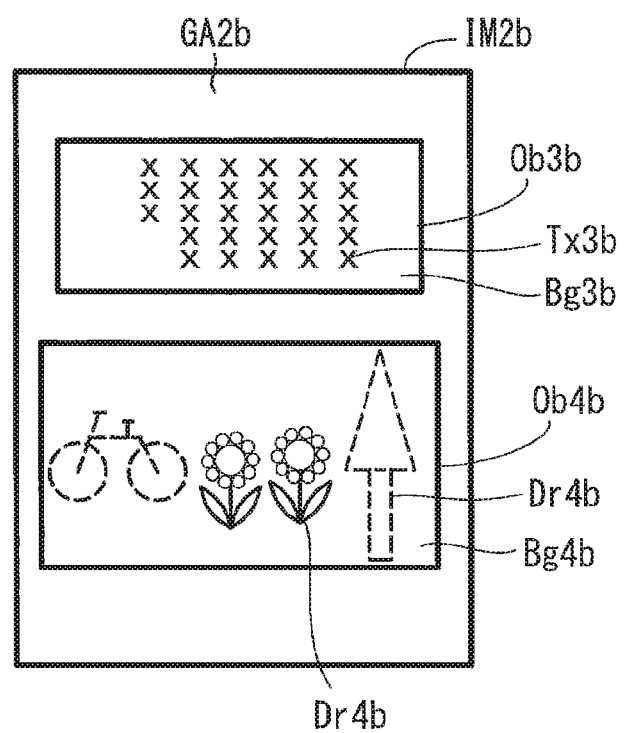
FIG. 11B is a diagram showing a comparative example of a post-correction target image that will be obtained if the target image shown in FIG. 3B were subjected to the first correction process in the embodiment.

As a comparative example, FIG. 11B shows a corrected target image IM2b that will be obtained if the first correction process were performed on the target image data representing the target image IM2 of FIG. 3B. Through the first correction process, the color of the background GA2 in the target image IM2 (FIG. 3B) is changed to white. Accordingly, the corrected target image IM2b (FIG. 11B) has a white background GA2b. Therefore, removal of the background color is appropriately carried out. However, colors of the objects Ob3 and Ob4 in the target image IM2 are also corrected through the first correction process so as to approach white as a whole. Accordingly, colors of post-correction objects Ob3b and Ob4b in the corrected target image IM2b become different from the colors of the pre-correction objects Ob3 and Ob4 in the pre-correction target image IM2.

Especially in the case where colors of the objects Ob3 and Ob4 are brighter than the color of the background GA2 in the pre-correction target image IM2, the colors of the objects could possibly be changed through the first correction process to such colors that are close to white or that are completely identical with white. In the example of FIG. 11B, colors of the backgrounds Bg3b and Bg4b in the post-correction objects Ob3b and Ob4b become white, and parts of the drawings Dr4b in the post-correction object Ob4b are on the brink of disappearance. In this manner, the corrected target image IM2b has the background color appropriately removed, but the corrected target image IM2b suffers from such problems that colors of objects have been partly converted to excessively bright colors and disappeared. The first correction process is liable to cause such problems especially when color of the background in a pre-correction target image is relatively low in brightness. The second correction process does not cause such problems even though the color of the background in a pre-correction target image is relatively low in brightness.

In the present embodiment, any color falling in the specific color region PCS has brightness lower than the background color indicated by the background color value BC. Accordingly, when target image data has a relatively large number of pixels whose brightness is greater than or equal to that of the background color, the second correction process is performed on the target image data. As a result, those pixels, whose color values are outside the background-color approximate region, are not corrected. It is possible to restrain reduction in the image quality of a corrected target image that might possibly occur when color of regions, whose brightness is greater than or equal to the background color, is corrected and disappear, for example.

Moreover, in the embodiment, the specific color region PCS is a partial space, into which the RGB color space CS is partitioned such that a boundary value of the specific color region PCS in each color component is equal to each color component value in the background color value BC (R1, G1, B1) and such that the specific color region PCS contains black. As described above, the light of a component corresponding to the color of the paper sheet (i.e., the color indicated by the background color value BC) is absorbed by the entire paper sheet. Accordingly, as in the case of the target image IM1, if the target image IM has been generated from such a document that has an image printed on a paper sheet whose color is different from white, the possibility is relatively high that the R value, G value, and B value of color contained in the image are respectively smaller than the R value, G value, and B value of the background color value BC. By setting the specific color region PCS as described above and by judging whether or not the percentage of the first-type pixels, whose color values are within the specific color region PCS, is greater than or equal to the prescribed value TH1, it is possible to appropriately determine whether or not the target image IM has been generated from such a document that has an image printed on a paper sheet whose color is different from white.

In the above-described image process, the CPU 210 analyzes the scan data as the target image data. More specifically, the CPU 210 generates histogram data, thereby identifying most frequently appearing values among the values of the plurality of pixels contained in the scan data (S20 in FIG. 2, FIGS. 4A-4C). Then, the CPU 210 sets, as the background color, such a color that is defined based on the most frequently appearing values (S30 in FIG. 2). More specifically, the CPU 210 sets, as a color value indicative of the background color, a background color value BC (R1, G1, B1) whose each color component value is equal to the most frequently appearing value in the each color component. By analyzing scan data in this way, the CPU 210 can appropriately determine the background color of the target image IM.

As described above with reference to formulae (1) to (3) and FIG. 8A, an amount of correction by the first correction process becomes smaller as a pre-correction pixel is lower in brightness. It can therefore be said that, in the first correction process, an amount of correction to a pixel value falling within a black-containing specific range is smaller than an amount of correction to a pixel value falling in another range whose brightness is higher than the black-containing specific range, wherein the black-containing specific range is such a range that contains a color value indicating black (or a color value indicating the lowest brightness). The black-containing specific range is an example of a third range, and the another range whose brightness is higher than the black-containing specific range is an example of a fourth range. In general, the background color is a color whose brightness is somewhat higher than that of black. Accordingly, the black-containing specific range is entirely outside of the range in which colors close to the background color fall. In other words, an entire part of the black-containing specific range is outside of the background-color approximate region. More specifically, the distance D from the background color value BC to any color value falling in the black-containing specific range is greater than the second threshold value TH2. Accordingly, color of an object, whose brightness is relatively low, is changed by a relatively small amount through the first correction process. By setting small the correction amount to objects such as characters whose brightness is relatively low, those objects are prevented from becoming difficult to read when the objects are corrected through the first correction process. In many cases, characters are in black. Therefore, by setting small the amount of correction for the black-containing specific range containing the color value indicating black, the CPU 210 can appropriately prevent the characters from becoming difficult to read.

As described above, the amount of correction through the first correction process is set such that as the brightness of a pixel decreases, the amount of correction to the color value of the pixel becomes continuously smaller. As a result, the CPU 210 can carry out the first correction process in such a way as to prevent an object whose brightness is relatively low, such as characters, from becoming difficult to read, as well as to prevent an unnatural change in the color of the target image IM.

As described above, the first correction process changes the color value of a pixel indicating the background color to the value of a prescribed color (white in this example). The first correction process also corrects, or changes, the color value of a pixel indicating a color different from the background color based on both of: the amount of difference between the color value indicating the background color and the color value indicating the prescribed color; and the color value of the subject pixel. Therefore, a balance in terms of color can be appropriately adjusted across the entire part of the target image IM through the first correction process. In addition, even if a color cast has occurred on the target image IM, the first correction process can appropriately eliminate the color cast.

Furthermore, as shown in FIG. 9, the second correction process changes those pixel values, whose distances D from the background color value BC are less than or equal to the second threshold value TH2 and therefore which fall in the background-color approximate region (S230 in FIG. 9), to such post-correction values that are equal to the color value indicating the prescribed color (white, in this example). The second correction process does not change the other pixel values that fall outside the background-color approximate region. Therefore, in the corrected target image IM obtained through the second correction process, the background color has been appropriately removed, and changes in colors of the objects have been appropriately restrained.

B. Modifications (1) The first correction process according to a first modification will be described with reference to FIG. 8B. The first correction process according to the present modification is performed in S70 instead of the first correction process of the above-described embodiment.

In the first correction process of the present modification, the color of an object whose color is relatively low in brightness is not corrected. More specifically, according to the present modification, an XYZ value (Xb, Yb, Zb) is defined as a reference value. Then, for each color component value in a pixel value defined in the XYZ color space, only such a color component value that is greater than or equal to the corresponding color component value in the reference value (Xb, Yb, Zb) is changed, but a color component value that is smaller than the corresponding color component value in the reference value (Xb, Yb, Zb) is not changed.

Figure 8B:
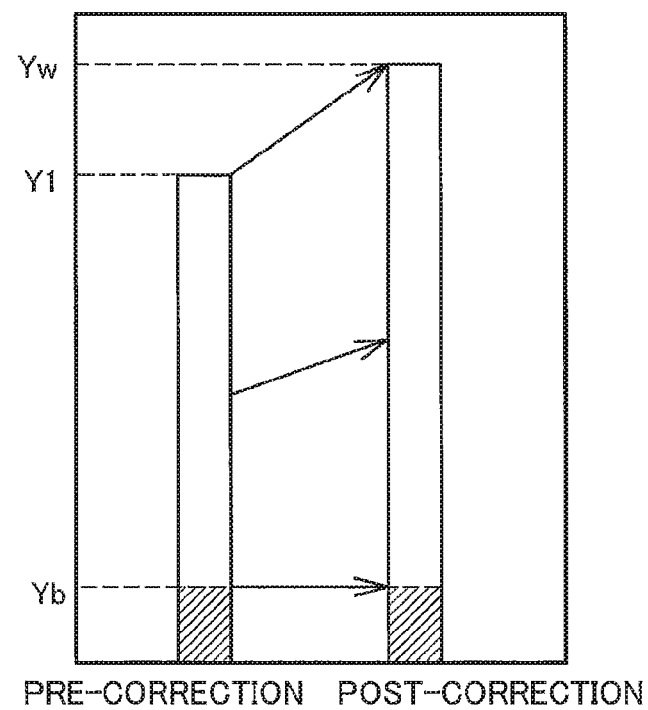
FIG. 8B is a diagram illustrating how a pixel value is corrected in the first correction process according to a first modification.

For example, according to the present modification, as for the Y value, the Y-value Y1 of the background color value BC is changed to the Y-value Yw of white (Xw, Yw, Zw), as shown in FIG. 8B. Of the Y-values that are different from Y1, a Y-value that is greater than Yb is changed such that the corrected Y value will continuously change with respect to a change in the pre-correction Y-value. However, a Y-value that is less than or equal to Yb is not corrected. The same is true for the X and Z values.

More specifically, for each component value that is greater than the corresponding component value in the reference value (Xb, Yb, Zb), correction is performed in the following formulae (4) to (6) according to this modification, by using the white XYZ value (Xw, Yw, Zw), the pre-correction XYZ value (Xin, Yin, Zin), the post-correction XYZ value (Xout, Yout, Zout), the background color value BC (X1, Y1, Z1), and the reference value (Xb, Yb, Zb):

$$Xout=((Xw-Xb)/(X1-Xb))\times(Xin-Xb)+Xb \quad (4)$$

$$Yout=((Yw-Yb)/(Y1-Yb))\times(Yin-Yb)+Yb \quad (5)$$

$$Zout=((Zw-Zb)/(Z1-Zb))\times(Zin-Zb)+Zb \quad (6)$$

According to the present modification, therefore, the first correction process does not change such a pixel value (X, Y, Z) whose X-, Y-, and Z-values fall within a range in the XYZ color space, in which the X-value is greater than or equal to 0 and smaller than or equal to Xb (0≤X≤Xb), the Y-value is greater than or equal to 0 and smaller than or equal to Yb (0≤Y≤Yb), and the Z-value is greater than or equal to 0 and smaller than or equal to Zb (0≤Z≤Zb). As for a value of pixel that falls in a range higher in brightness than the above-described range, color is adjusted in such a direction that the background color (X1, Y1, Z1) approaches white (Xw, Yw, Zw), as in the embodiment. The first correction process of this modification can appropriately prevent an object whose brightness is relatively low, such as characters, from becoming difficult to read, while adjusting a balance in terms of color within the target image IM.

Either the first correction process (FIG. 8A) in the embodiment or the first correction process (FIG. 8B) in the present modification may be selected depending on the situation. For example, when the background color is relatively dark, or, more specifically, when the Y-value Y1 of the background color value BC (X1, Y1, Z1) for the target image IM is less than or equal to a predetermined threshold value, the CPU 210 may perform the first correction process of the present modification (FIG. 8B). When the background color is relatively bright, or, more specifically, when the Y-value Y1 of the background color value BC (X1, Y1, Z1) is greater than the predetermined threshold value, the CPU 210 may perform the first correction process of the above-described embodiment (FIG. 8A). Accordingly, only in the cases where the possibility is high that execution of the first correction process of the embodiment (FIG. 8A) will make an excessively great amount of changes to such objects whose brightness is relatively low, such as characters, the CPU 210 performs the first correction process of this modification (FIG. 8B), thereby more appropriately preventing objects such as characters from becoming difficult to read. Moreover, in the cases where the possibility is low that execution of the first correction process of the embodiment (FIG. 8A) will make an excessively great amount of changes to objects whose brightness is relatively low, such as characters, the CPU 210 performs the first correction process of the embodiment (FIG. 8A), thereby more appropriately adjusting a balance in terms of color in the entire target image IM.

In the above description, the reference value (Xb, Yb, Zb) is a predetermined, fixed value. However, the reference value (Xb, Yb, Zb) may be determined based on a color inputted by a user. For example, a user inputs, via a predetermined user interface (UI) screen, a color that is recognized by the user as a color that should not be changed through the correction. The reference value (Xb, Yb, Zb) is determined such that the value of each component in the reference value (Xb, Yb, Zb) is greater than the value of a corresponding component in an XYZ value (Xu, Yu, Zu) that is indicative of the color inputted by the user. That is, the reference value (Xb, Yb, Zb) is determined to satisfy the relationship that Xb is greater than Xu (Xb>Xu), Yb is greater than Yu (Yb>Yu), and Zb is greater than Zu (Zb>Zu).

Or, the reference value (Xb, Yb, Zb) may be determined based on the color of characters contained in the target image IM. For example, the CPU 210 identifies a character region in the target image IM by performing a well-known image analysis process, and identifies the color of characters based on the color distribution in the character region. The reference value (Xb, Yb, Zb) is determined such that the value of each component in the reference value (Xb, Yb, Zb) is greater than the value of a corresponding component in an XYZ value (Xt, Yt, Zt) that is indicative of the identified color of the characters. That is, the reference value (Xb, Yb, Zb) is determined to satisfy the relationship that Xb is greater than Xt (Xb>Xt), Yb is greater than Yt (Yb>Yt), and Zb is greater than Zt (Zb>Zt).

(2) The first correction process according to a second modification will be described below. In the first correction process of the second modification, the background color value BC (X1, Y1, Z1) is changed to white (Xw, Yw, Zw) as in the embodiment. As the brightness of color in an input value (pre-correction value) decreases, the degree of change in an output value (i.e., post-correction value), with respect to change in the input value (i.e. pre-correction value), decreases in stages. The degree of change will also be referred to as a correction level, hereinafter.

Figure 12:
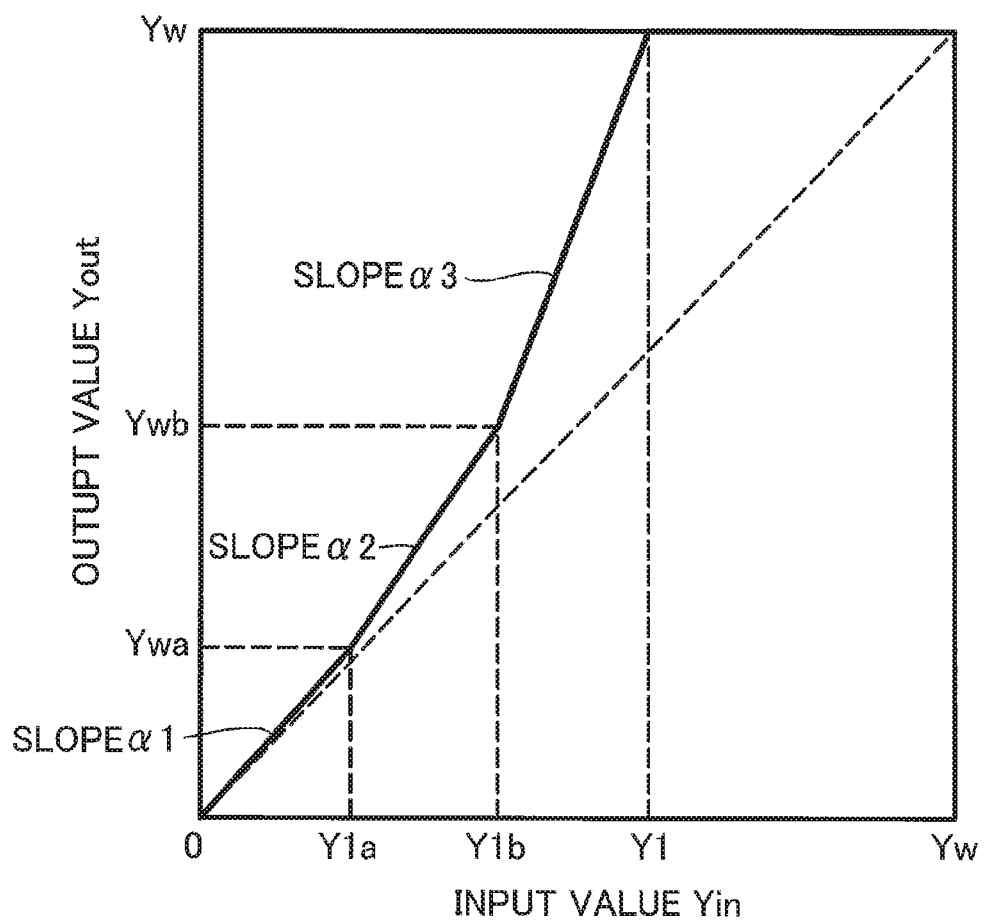
FIG. 12 is a diagram showing relationship between an input value and an output value in the first correction process according to a second modification.

A specific example of the first correction process according to the second modification will be described for the Y value, for example. FIG. 12 is a diagram showing an example of relation between an input value Yin and an output value Yout in the first correction process according to the present modification. As shown in FIG. 12, the Y values in the range of 0 to Y1 are corrected with correction levels that are different from one another among: the range of greater than or equal to 0 and smaller than Y1a ($0 \leq Y < Y1a$); the range of greater than or equal to Y1a and smaller than Y1b ($Y1a \leq Y < Y1b$); and the range of greater than or equal to Y1b and smaller than or equal to Y1 ($Y1b \leq Y \leq Y1$). Incidentally, Y1a and Y1b are values that satisfy the relationship that Y1a is smaller than Y1b and Y1b is smaller than Y1 (Y1a<Y1b<Y1). For example, Y1a is equal to one third of Y1 (Y1a=(⅓)Y1), and Y1b is equal to two thirds of Y1 (Y1b=(⅔)Y1). The correction levels are expressed by slopes α1, α2, and α3 of a line representing the relation between input value Yin and output value Yout as shown in FIG. 12. As can be seen from FIG. 12, the correction levels become smaller as the brightness of the color decreases, or as the component value (e.g., Y value) becomes smaller. That is, the slopes α1, α2, and α3 satisfy the relationship that a1 is smaller than α2 and α2 is smaller than α3 (α1<α2<α3).

Suppose that the output value Yout becomes equal to Ywa, Ywb, and Yw when the input value Yin is equal to Y1a, Y1b, and Y1, respectively. In such a case, the output value Yout (or post-correction value) can be calculated by the following formulae (7) to (9):

$$Yout = \alpha 1 \times Yin (0 \leq Yin < Y1a) \quad (7)$$

$$Yout = \alpha 2 \times (Yin - Y1a) + Ywa (Y1a \leq Yin < Y1b) \quad (8)$$

$$Yout = \alpha 3 \times (Yin - Y1b) + Ywb (Y1b \leq Yin \leq Y1) \quad (9)$$

wherein α1=(Ywa/Y1a), α2=((Ywb−Ywa)/(Y1b−Y1a)), and α3=((Yw−Ywb)/(Y1−Y1b)). In the above description, the Y value is described as an example. Similar corrections are made to the X and Z values.

According to the first correction process of the second modification, the CPU can more appropriately prevent an object whose brightness is relatively low, such as characters, from becoming difficult to read. The CPU is also able to continuously and naturally adjust a balance in terms of color in the target image IM with respect to a change in the value of pixel.

(3) In the above-described embodiment, the specific color region PCS is defined in the RGB color space CS. Instead, the specific color region may be defined in other color spaces, including: HSV color space; YCbCr color space; and color spaces that are not dependent on the device, such as CIELAB color space or CIELUV color space. For example, RGB values falling inside the specific color region PCS in the RGB color space CS may be plotted in the CIELAB color space with the use of conversion formulae between color values in the sRGB color space and color values in the CIEXYZ color space, thereby expressing the specific color region in the CIELAB color space.

(4) In the above-described embodiment and modifications, the specific color region PCS is expressed in the RGB color space. However, the specific color region PCS may be expressed in other ways. For example, the specific color region PCS may be a color region that is determined based only on brightness. For example, an L* value defined in the CIELAB color space may be calculated based on the background color value BC (R1, G1, B1), and the calculated L* value is set as indicative of brightness of the background color. Then, in the CIELAB color space, a region whose brightness is less than or equal to the calculated L* value may be used as the specific color region PCS.

(5) It is preferred that the specific color region PCS is such a region whose brightness is lower than that of the background color, as in the embodiment. However, there is such a case, in which it is desired to perform the second correction process on a target image only if it is apparent that the target image contains an object whose brightness is higher than that of the background color. In such a case, the specific color region PCS may be defined as such a region that contains a region whose brightness is close to but higher than that of the background color value BC. In general, the specific color region PCS should be a region that is determined based on the background color value BC.

(6) In the embodiment, the background color value BC representative of the background color is determined based on the most frequently appearing value in each component of the RGB value. Instead, the background color value BC may be calculated according to other methods. For example, the average of values of those pixels that exist within a predetermined region along an outer edge of a target image IM may be used as the background color value BC for the target image IM.

(7) In the second correction process according to the embodiment, RGB values inside the background-color approximate region are changed to the single RGB value (255, 255, 255) representative of white, regardless of the original RGB values. Instead, the RGB values inside the background-color approximate region may be changed such that the RGB values will approach white by an amount that depends on the original RGB values. For example, in the second correction process, the same formulae (1) to (3) that are used in the first correction process may be used to correct the RGB values inside the background-color approximate region. No corrections may be made on the RGB values outside the background-color approximate region.

(8) Image data other than scan data may be used as target image data IM in the above-described embodiment and modifications. For example, image data indicative of drawings that a user has created on personal computer may be used as target image data IM.

(9) The image process performed by the CPU 210 of the multifunction apparatus 200 may be performed by CPU of a personal computer that is connected to a scanner. In this case, for example, the CPU in the personal computer may carry out the image process by executing a scanner driver program that is supplied from a manufacturer of the scanner. Instead of the multifunction apparatus 200, another image processing apparatus (e.g., scanner or digital camera) which includes an image reading unit to optically read a target and thereby generate image data representing the target may be used to realize the image process. In this case, as in the case of the multifunction apparatus 200, the image processing apparatus can perform the image process (or the process shown in FIG. 2, for example) on image data that is generated by the image reading unit provided in the image processing apparatus.

Generally, the image processing apparatus that implements the image process is not limited to the multifunction apparatus 200, but may be any of other various image processing apparatuses. Examples of the other image processing apparatuses include: a computer internally provided in an image processing apparatus, such as a printer, a digital camera, and a scanner; a general-purpose personal computer; and a server connected to a network. Further, a plurality of computers that can communicate over a network may each implement some of the functions of the image process so that the devices as a whole can execute the image process. In this case, the entire set of computers that contribute to the image process serves as an image processing apparatus.

(10) Part of the configuration implemented in hardware in the above-described embodiment and modifications may be replaced with software and, conversely, all or part of the configuration implemented in software may be replaced with hardware.

The image processing apparatus 200 can be modified into various forms, such as a control apparatus for controlling a printer, a control apparatus for controlling an image reader, an image processing method, a computer program realizing the functions of the above-described apparatuses and the above-described image processing method, and a non-transitory computer readable storage medium storing the computer program.

In the above description, each color value is defined by a combination of a plurality of color component values. However, each color value may be defined only by a single value.

While the description has been made in detail with reference to the specific embodiment and modifications thereof, it would be apparent to those skilled in the art that various changes and modifications may be made therein without departing from the spirit and scope of the above described embodiment and modifications.

For example, in S50, the CPU 210 calculates, as the percentage of the first-type pixels, a ratio of the number of the first-type pixels relative to the total number of the pixels contained in the target image data. However, the CPU 210 may calculate, as the percentage of the first-type pixels, a ratio of the number of the first-type pixels relative to a number that is not exactly equal to but is slightly different from the total number of the pixels contained in the target image data.

What is claimed is:

1. An image processing apparatus comprising a controller comprises at least one processor configured to perform:
   acquiring target image data representative of a target image, the target image data including a plurality of pixel values for a plurality of pixels in the target image data;
   determining whether or not a ratio of a number of first type pixels relative to a number of the plurality of pixels in the target image data is greater than or equal to a prescribed value, the first type pixels being the pixels in the target image data whose pixel values are within a first range, the first range being defined based on a color value indicative of a background color of the target image;
   executing a first correction on the target image data when the ratio is determined to be greater than or equal to the prescribed value, the first correction correcting, among pixel values in the target image data, both of internal pixel values which are within a second range and external pixel values which are out of the second range, the second range containing the color value of the background color;
   executing a second correction on the target image data when the ratio is determined to be smaller than the prescribed value, the second correction correcting the internal pixel values and not correcting the external pixel values; and
   outputting corrected target image data that is obtained by executing the first correction or the second correction on the target image data.

2. The image processing apparatus as claimed in claim 1, wherein brightness of a color value falling in the first range is lower than brightness of the background color.

3. The image processing apparatus as claimed in claim 2, wherein the first range is expressed in a prescribed color space that is defined by a plurality of color components, the prescribed color space containing a set of color component values indicative of black and another set of color component values indicative of the background color, the first range being a partial space, into which the prescribed color space is partitioned such that the first range contains therein the set of color component values indicative of black and such that a boundary of the first range has a color component value for each color component that is equal to a color component value for the each color component in the another set of color component values representative of the background color.

4. The image processing apparatus as claimed in claim 1, wherein the target image data is scan data obtained by optically reading an original document, the scan data including, as each pixel value, a set of color component values defined for a plurality of color components, and wherein the controller being further configured to perform:

analyzing the scan data to determine, for each color component, a most-frequently-occurring color component value that occurs most frequently within the scan data for the each color component; and setting, as the color value of the background color, a set of color component values that are determined based on the most-frequently-occurring color component values.

5. The image processing apparatus as claimed in claim 1, wherein a correction amount, by which the first correction corrects a pixel value falling within a third range, is smaller than a correction amount, by which the first correction corrects another pixel value falling within a fourth range, an entire part of the third range being out of the second range, brightness of a color value falling in the fourth range being higher than that of a color value falling in the third range.

6. The image processing apparatus as claimed in claim 5, wherein in the first correction, the pixel value of each pixel in the target image data is corrected by a correction amount that decreases continuously as brightness of the each pixel decreases.

7. The image processing apparatus as claimed in claim 5, wherein in the first correction, the pixel value falling within the fourth range is corrected, and the pixel value falling within the third range is not corrected.

8. The image processing apparatus as claimed in claim 5, wherein the third range includes a color value representing black.

9. The image processing apparatus as claimed in claim 1, wherein in the first correction, a pixel value representing color the same as the background color is changed to such a post-correction pixel value that is equal to a color value representing a prescribed color, and a pixel value representing color different from the background color is corrected dependently on: an amount of difference between the color value representing the background color and the color value representing the prescribed color; and the subject pixel value.

10. The image processing apparatus as claimed in claim 1, wherein in the second correction, the internal pixel values are changed to post-correction pixel values that are equal to a color value representing a prescribed color, and the external pixel values are not corrected.

11. A method of processing an image, the method comprising:

acquiring target image data representative of a target image, the target image data including a plurality of pixel values for a plurality of pixels in the target image data;

determining whether or not a ratio of a number of first type pixels relative to a number of the plurality of pixels in the target image data is greater than or equal to a prescribed value, the first type pixels being the pixels in the target image data whose pixel values are within a first range, the first range being defined based on a color value indicative of a background color of the target image;

executing a first correction on the target image data when the ratio is determined to be greater than or equal to the prescribed value, the first correction correcting, among pixel values in the target image data, both of internal pixel values which are within a second range and external pixel values which are out of the second range, the second range containing the color value of the background color;

executing a second correction on the target image data when the ratio is determined to be smaller than the prescribed value, the second correction correcting the internal pixel values and not correcting the external pixel values; and outputting corrected target image data that is obtained by executing the first correction or the second correction on the target image data.

12. A non-transitory computer-readable storage medium storing a set of program instructions for an image processing apparatus, the program instructions, when executed by the image processing apparatus, causing the image processing apparatus to perform:

acquiring target image data representative of a target image, the target image data including a plurality of pixel values for a plurality of pixels in the target image data;

determining whether or not a ratio of a number of first type pixels relative to a number of the plurality of pixels in the target image data is greater than or equal to a prescribed value, the first type pixels being the pixels in the target image data whose pixel values are within a first range, the first range being defined based on a color value indicative of a background color of the target image;

executing a first correction on the target image data when the ratio is determined to be greater than or equal to the prescribed value, the first correction correcting, among pixel values in the target image data, both of internal pixel values which are within a second range and external pixel values which are out of the second range, the second range containing the color value of the background color;

executing a second correction on the target image data when the ratio is determined to be smaller than the prescribed value, the second correction correcting the internal pixel values and not correcting the external pixel values; and outputting corrected target image data that is obtained by executing the first correction or the second correction on the target image data.

* * * * *